(12) United States Patent
Iverson et al.

(10) Patent No.: US 6,767,470 B2
(45) Date of Patent: Jul. 27, 2004

(54) METHOD FOR CLEANING AND MAINTAINING WATER DELIVERY SYSTEMS

(75) Inventors: Carl E. Iverson, Olympia, WA (US); Scott P. Ager, Tumwater, WA (US)

(73) Assignee: $CH_2O$ Incorporated, Olympia, WA (US)

(*) Notice: Subject to any disclaimer, the term of this patent is extended or adjusted under 35 U.S.C. 154(b) by 97 days.

(21) Appl. No.: 09/921,843

(22) Filed: Aug. 3, 2001

(65) Prior Publication Data

US 2002/0014463 A1 Feb. 7, 2002

Related U.S. Application Data

(60) Provisional application No. 60/223,215, filed on Aug. 4, 2000, and provisional application No. 60/280,447, filed on Mar. 29, 2001.

(51) Int. Cl.[7] .................................................. C02F 1/76
(52) U.S. Cl. ...................... 210/699; 210/701; 210/755; 210/704; 252/181; 422/37; 424/661
(58) Field of Search ................................ 210/698–701, 210/754, 755, 704; 252/180, 181; 422/15, 19, 37, 17; 424/661

(56) References Cited

U.S. PATENT DOCUMENTS

| | | | | |
|---|---|---|---|---|
| 4,568,463 A | * | 2/1986 | Klein | .......................... 210/607 |
| 4,693,832 A | * | 9/1987 | Hurst | .......................... 210/756 |
| 4,913,822 A | * | 4/1990 | Chen et al. | ................. 210/699 |
| 5,314,629 A | * | 5/1994 | Griese et al. | ............... 210/754 |
| 5,324,477 A | * | 6/1994 | Schroeder et al. | ............ 422/37 |
| 5,424,032 A | * | 6/1995 | Christensen et al. | .......... 422/14 |
| 6,096,226 A | * | 8/2000 | Fuchs et al. | ................. 210/759 |
| 6,345,632 B1 | * | 2/2002 | Ludwig et al. | .......... 134/22.11 |
| 6,350,410 B1 | * | 2/2002 | Iverson et al. | ................ 422/29 |

* cited by examiner

*Primary Examiner*—Peter A. Hruskoci
(74) *Attorney, Agent, or Firm*—Delbert J. Barnard

(57) ABSTRACT

A sodium chlorite solution is admixed with a second solution containing an acid to make a reacted mixture. The reacted mixture is introduced into a water system, viz. a conduit in which water flows or a tank containing water. The reacted mixture is added to the water system to inhibit and/or eliminate bacterial fouling in the system, and/or inhibiting and/or removing mineral deposits from the system, and/or for reducing or eliminating microorganisms from the system. The second component is acidic enough to convert the sodium chlorite into chlorine dioxide while remaining unaffected in the reacted mixture and at the same time being a mineral antiscalant. Optimum conversion of the sodium chlorite component into active chlorine dioxide requires at least several minutes reaction time and, preferably, the use of a suitable catalyst, such as sodium molybdate.

6 Claims, 1 Drawing Sheet

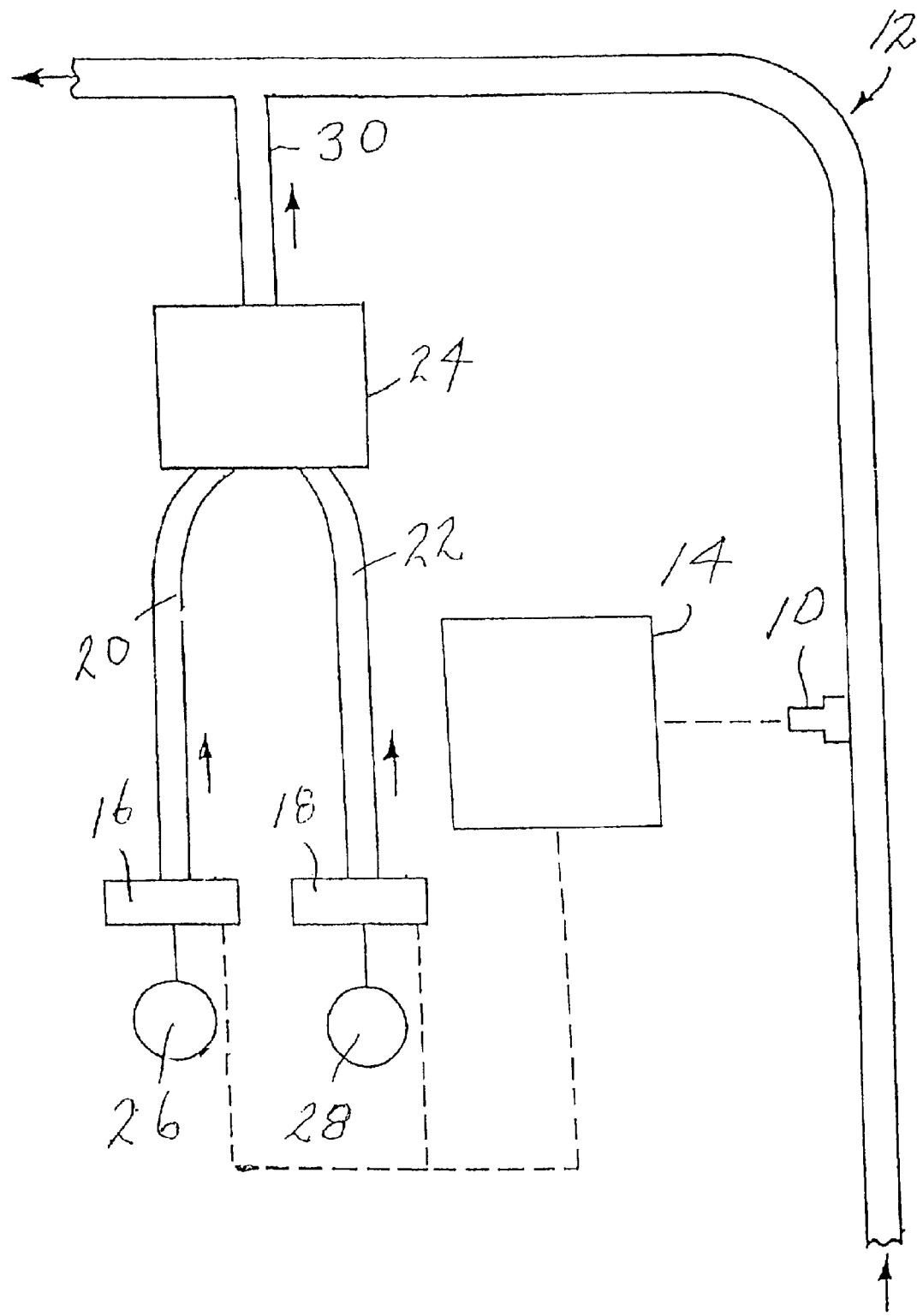

METHOD FOR CLEANING AND MAINTAINING WATER DELIVERY SYSTEMS

RELATED APPLICATIONS

This application claims priority to provisional application Ser. No. 60/223,215, filed Aug. 4, 2000, and to provisional application Ser. No. 60/280,447, filed Mar. 29, 2001.

TECHNICAL FIELD

This invention relates to a method and composition for cleaning and maintaining water storage and/or distribution systems. More particularly, it relates to the use of a reacted mixture of a sodium chlorite solution and a second solution containing an acid for inhibiting and/or removing bacterial fouling an/or inhibiting and/or removing mineral deposits, and/or eliminating microorganisms from water storage and/or distribution systems.

BACKGROUND OF THE INVENTION

Water is stored in reservoirs and tanks and is delivered by conduits to places where the water is used. Water storage and delivery systems often become fouled and/or obstructed by mineral scale deposits and/or biological growths and/or bio-films. Irrigation systems used in the agricultural industry can experience fouling that is so severe that water flow is reduced to a level where valuable crops receive insufficient watering and perish from dehydration.

There is a need for compounds that can be added to water storage and delivery systems for eliminating the mineral and biological substances that cause the obstructions and comprise the systems. A principal object of this invention is to provide such a composition and a method of its use for cleaning and maintaining water delivery systems, including tanks, reservoirs and conduits.

There is also a need for an easily achieved on-site metering and mixing of the components of the composition and an easily achieved introduction of the composition into the water delivery system. Another object of the present invention is to fulfill this need.

BRIEF SUMMARY OF THE INVENTION

A basic aspect of the present invention is to admix a sodium chlorite solution with a second solution containing an acid to make a reacted mixture. A predetermined amount of this reacted mixture is then introduced into water in a water distribution system.

According to an aspect of the invention, the reacted mixture is introduced into a water system to inhibit and/or eliminate bacterial fouling in the system. Another aspect of the invention is to introduce the activated mixture into to the water for inhibiting and/or removing mineral deposits from the system. Yet another aspect of the invention is to introduce the activated mixture into the water for eliminating microorganisms from the system.

According to yet another aspect of the invention, the second component is acid enough to convert the sodium chlorite into chlorine dioxide while remaining unaffected in the reacted mixture and at the same time being a mineral antiscalant. The second solution may be formed by adding PBTC and sodium molybdate di-hydrate and water. The second compound may be a mixture of mineral acids and an antiscalant polymer. The antiscalant polymer may be polyacrylic acid or a polymeric compound.

According to an aspect of the invention, a catalyst is used to enhance conversion of the sodium chlorite into an active biocide, chlorine dioxide. By way of typical and therefore non limitive example, the catalyst may be sodium molybdate.

Other objects, advantages and features of the invention will become apparent from the description of the best mode set forth below, from the drawing, from the claims and from the principles that are embodied in the specific structures, compositions and method steps that have been illustrated and described.

BRIEF DESCRIPTION OF THE SEVERAL VIEWS OF THE DRAWING

The drawing is a flow diagram of a water distribution system and equipment for preparing the composition of the invention and introducing it into the water system.

DETAILED DESCRIPTION OF THE INVENTION

The drawing shows, by way of example, a portion of an irrigation system that includes a flow meter 10 in a conduit 12, e.g. an irrigation pipe. The flow meter 10 measures the flow in the conduit 12 and generates an electrical control signal that is proportional to the flow. The electrical signal may be electrical pulses that are sent to a pulse divider 14 which generates electrical control signals that are sent to controllers for two chemical feed pumps 16, 18. The electrical signals from pulse divider 14 may be electrical pulses which control the pumps 16, 18 for proportionally pumping the two components that are mixed. Preferably, the pumps 16, 18 are positive displacement pumps that include pistons. The control signals control the movement of the pistons. Each pumping stroke sends a predetermined volume of chemical into a conduit 20, 22 leading from a pump 16, 18 to a reaction chamber 24. Pump 16 pumps a first solution or component from its storage tank 26 to the reaction chamber 24. Pump 18 pumps a second solution or component from its storage tank 28 to the reaction chamber 24. The two solutions are precursor chemicals that are allowed to intermingle or react for the period of time, e.g. ten or more minutes, in the reaction chamber 24. The reacted mixture is removed through the top of the reaction chamber 24 and is delivered by a conduit 30 into the water conduit 12, into admixture with water that is flowing through the conduit 12. The admixture of the reacted solution in the water substantially instantly dilutes the reacted mixture to a desired working concentration for distribution by conduit 12 throughout the water system.

By way of example, the flow sensor may be a Module IP115 hot-tap insertion flow sensor, manufactured by Sea Metrics, Inc., having a business address of 20419 80$^{th}$ Ave.S., Kent, 98032. The pulse divider may be a model PD10 pulse divider, also manufactured by Sea Metrics, Inc. The pumps may be model B711-392SI pumps manufactured by LMI Milton Roy, having a business address of 8 Post Office Square, Acton Mass. 01720. The reaction chamber 24 may be an off the shelf item. It may be what is known as a reaction column that is made from schedule 80PVC pipe, measuring two inches in diameter, and twelve inches long, with end caps and tubing fittings.

The pumps 16, 18 force the reactants into the bottom of the reaction chamber or column. The pressure of the pumps 16, 18 forces the reacted mixture up out of the top of the reaction chamber 24, following between ten to twenty minutes admixing time of the reactants in the reaction chamber 24. The pumps 16, 18 are 1.6 gallon per hour capacity pumps.

The following are some examples that are submitted for the purpose of making it easier to understand the invention.

EXAMPLE 1

A solution containing 17.5% wt/wt of PBTC, 0.1% wt/wt sodium molybdate di-hydrate ($Na_2MoO_4:2H_2O$) in water was added to an equal volume of 7.5% wt/wt sodium chlorite ($NaClO_2$) in water. After allowing the mixture to react for ten minutes, small aliquots were added to a liter of stirred irrigation water from a berry farm until the chlorine dioxide level reached 0.5 parts per million. After fifteen minutes, samples were taken for enumeration of bacteria on aerobic plate count agar. Approximately a 10,000 fold reduction in bacteria was achieved based on the initial bacterial content of the untreated irrigation water. Water samples treated with only the PBTC solution showed no decrease in bacterial counts.

EXAMPLE 2

An irrigation system at a California vineyard carrying 1500 gallons per minute of water was treated with the chemical composition in Example 1 resulting in a final concentration of 0.2 ppm chlorine dioxide and 0.8 ppm PBTC. After several days, the bacterial counts increased due to dispersion and dislodging of established biofilms in the system. However, within a week of continuous treatment, the bacterial counts decreased 100 fold from the initial level of approximately 1000 organisms per ml to less than 10.

EXAMPLE 3

A sample of irrigation water heavily contaminated with iron related bacteria (IRB), a major source of bio-fouling was treated with the solution of Example 1 to achieve a chlorine dioxide residual of 0.25 ppm. After a fifteen minute contact time, the treated water was analyzed for IRB using the BART (Biological Activity Reaction Test) test kit sold by Droycon Bioconcepts, Inc., Regina, Saskatchewan, Canada. All traces of IRB were eliminated vs. the control untreated water, which contained an estimated IRB level of 1,000 per ml.

One of the reacted mixture may be sodium chlorite. Under acidic conditions this compound spontaneously forms chlorine dioxide, a powerful antimicrobial. Salts of hypochlorite or chlorine gas may be used in place of the sodium chlorite. This compound may be used to prepare hypochlorous acid in the reaction chamber 24. This reacted mixture is also a powerful antimicrobial. The second component may be an organophosponate compound such as 2-phosphonobutane-1,2,4-tricarboxylic acid (PBTC), CAS Registry No. 37971-36-1. Alternatively, the second component may be a mixture of mineral acids and antiscalant polymers such as polyacrylic acid or other polymeric compounds. The second component has the attributes of being acidic enough to convert sodium chlorite into chlorine dioxide while remaining unaffected in the reaction mixture. At the same time it is an excellent mineral antiscalant.

Very few chelants and/or antiscaling compounds remain unaffected in the presence of even dilute amounts of oxidizing compounds. PBTC is one of the very few chelants that demonstrates acceptable stability in the presence of strong oxidizers. Furthermore, the reaction of PBTC with sodium chlorite might be greatly accelerated and reaction time greatly reduced, by the inclusion of small amounts of a catalyst such as, but not limited to, sodium molybdate in the PBTC component prior to admixing it with the sodium chlorite component.

According to an aspect of the invention, the generation and delivery of antiscalant, antimicrobial mixture is easily achieved on-site by metering the individual component solutions into the reaction vessel 24, either by positive pumping or by vacuum eduction, and introducing the resultant reaction mixture into the water stream or volume. In some installations, the reaction mixture may be introduced into a body of water in a tank as opposed to flowing water in a conduit.

The process of generating and delivering the reaction mixture may be conducted intermittently by use of timer controlled chemical feed pumps, or can be conducted continuously, by flow controlled pumping or eduction. Optimum conversion of the sodium chlorite compound into active chlorine dioxide requires at least several minutes of reaction time and, preferably, the use of a suitable catalyst, such as sodium molybdate. Accordingly, the reaction or mixing chamber 24 should be of a suitable volume to allow the two solutions or components to co-mingle and react for the desired length of time before exiting the reaction chamber 24, into the conduit 12 or a water tank.

The illustrated embodiment is only a single example of the present invention and, therefore, is non-limitive. It is to be understood that many changes in the particular structure, materials and features of the invention may be made without departing from the spirit and scope of the invention. Therefore, it is our intention that our patent rights not be limited by the particular embodiment that is illustrated and described herein, but rather is to be determined by the following claims, interpreted according to accepted doctrines of claim interpretation, including use of the doctrine of equivalents.

What is claimed is:

1. A method of treating flowing water in a water distribution system, comprising;
   admixing a sodium chlorite solution with a second solution containing an acid to make a reacted mixture wherein the second solution is acidic enough to convert the sodium chlorite into chlorine dioxide while remaining unaffected in the reacted mixture;
   using sodium molybdate as a enhance conversion of the sodium chlorite into chlorine dioxide; and
   introducing a predetermined amount of the reacted mixture into said water distribution system to inhibit and/or eliminate bacterial fouling in the system;
   wherein the second solution inhibits and/or processes mineral deposits in the water system.

2. The method of claim 1, comprising introducing the reacted mixture into the water for reducing or eliminating microorganisms from the system.

3. The method of claim 1, wherein the second solution is formed by adding 2-phosphonobutane-1,2,4-tricarboxylic acid (PBTC) and sodium molybdate di-hydrate and water.

4. The method of claim 1, wherein the second solution contains PBTC.

5. The method of claim 1, wherein the second solution is a mixture of mineral acids and antiscalant polymers.

6. The method of claim 5, wherein the antiscalant polymer is polyacrylic acid.

* * * * *

(12) EX PARTE REEXAMINATION CERTIFICATE (10319th)
United States Patent
Iverson et al.

(10) Number: US 6,767,470 C1
(45) Certificate Issued: Oct. 9, 2014

(54) METHOD FOR CLEANING AND MAINTAINING WATER DELIVERY SYSTEMS

(75) Inventors: Carl E. Iverson, Olympia, WA (US); Scott P. Ager, Tumwater, WA (US)

(73) Assignee: CH2O Incorporated, Olympia, WA (US)

Reexamination Request:
No. 90/013,123, Jan. 17, 2014

Reexamination Certificate for:
Patent No.: 6,767,470
Issued: Jul. 27, 2004
Appl. No.: 09/921,843
Filed: Aug. 3, 2001

Related U.S. Application Data

(60) Provisional application No. 60/223,215, filed on Aug. 4, 2000, provisional application No. 60/280,447, filed on Mar. 29, 2001.

(51) Int. Cl.
| | |
|---|---|
| *C02F 5/14* | (2006.01) |
| *C02F 1/50* | (2006.01) |
| *C02F 1/76* | (2006.01) |
| *C02F 5/10* | (2006.01) |
| *C02F 5/08* | (2006.01) |

(52) U.S. Cl.
CPC ... *C02F 1/50* (2013.01); *C02F 1/76* (2013.01); *C02F 5/083* (2013.01); *C02F 5/14* (2013.01); *C02F 5/105* (2013.01); *C02F 2209/44* (2013.01); *C02F 2209/40* (2013.01)

USPC ........... 210/699; 210/701; 210/704; 210/755; 252/181; 422/37; 424/661

(58) Field of Classification Search
None
See application file for complete search history.

(56) References Cited

To view the complete listing of prior art documents cited during the proceeding for Reexamination Control Number 90/013,123, please refer to the USPTO's public Patent Application Information Retrieval (PAIR) system under the Display References tab.

*Primary Examiner* — Sean E Vincent

(57) ABSTRACT

A sodium chlorite solution is admixed with a second solution containing an acid to make a reacted mixture. The reacted mixture is introduced into a water system, viz. a conduit in which water flows or a tank containing water. The reacted mixture is added to the water system to inhibit and/or eliminate bacterial fouling in the system, and/or inhibiting and/or removing mineral deposits from the system, and/or for reducing or eliminating microorganisms from the system. The second component is acidic enough to convert the sodium chlorite into chlorine dioxide while remaining unaffected in the reacted mixture and at the same time being a mineral antiscalant. Optimum conversion of the sodium chlorite component into active chlorine dioxide requires at least several minutes reaction time and, preferably, the use of a suitable catalyst, such as sodium molybdate.

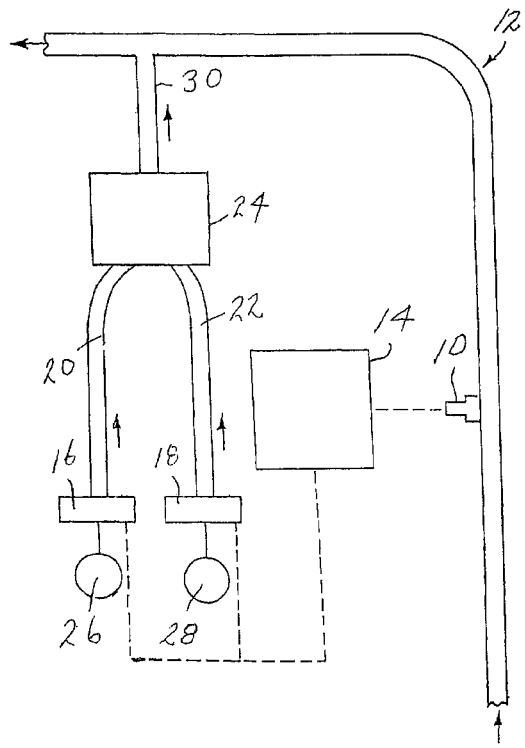

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-6, dependent on an amended claim, are determined to be patentable.

New claim 7 is added and determined to be patentable.

1. A method of treating flowing water in a water distribution system, comprising:
   admixing a sodium chlorite solution with a second solution containing an acid to make a reacted mixture wherein the second solution is acidic enough to convert the sodium chlorite into chlorine dioxide while remaining unaffected in the reacted mixture;
   using sodium molybdate as *a catalyst to* enhance conversion of the sodium chlorite into chlorine dioxide; and
   introducing a predetermined amount of the reacted mixture into said water distribution system to inhibit and/or eliminate bacterial fouling in the system;
   wherein the second solution inhibits and/or [processes] *removes* mineral deposits in the water system.

*7. The method of claim 1, wherein the reacted mixture comprises sodium chlorite.*

\* \* \* \* \*